United States Patent Office 3,527,817
Patented Sept. 8, 1970

3,527,817
HYDROGENATION OF HALOGENATED AROMATIC CARBONYL COMPOUNDS
Andrew J. Dietzler, Midland, Junior J. Lamson, Bay City, and Richard H. Hall, Midland, Mich., assignors to The Dow Chemical Company, Midland, Mich., a corporation of Delaware
No Drawing. Continuation-in-part of application Ser. No. 583,947, Oct. 3, 1966. This application Mar. 14, 1968, Ser. No. 712,967
Int. Cl. C07c 29/00, 31/16
U.S. Cl. 260—618                                  10 Claims

ABSTRACT OF THE DISCLOSURE

The hydrogenation of halogenated aromatic ketones and aldehyde to the corresponding carbinols in the presence of copper chromite catalyst is facilitated by the additional presence of an oxide or hydroxide of an alkaline earth metal.

CROSS REFERENCE TO RELATED APPLICATION

This application is a continuation-in-part of our copending application Ser. No. 583,947, filed Oct. 3, 1966, and now abandoned.

BACKGROUND OF THE INVENTION

The present invention relates to an improved chemical process and it relates particularly to an improved method for the hydrogenation of certain nuclearly halogenated aromatic ketones and aldehydes to the corresponding carbinols.

Copper chromite is known to be an effective catalyst for the hydrogenation of a carbonyl compound to the corresponding alcohol. Such reduction are customarily carried out under superatmospheric pressure, usually at about 5–500 atmospheres and at elevated temperatures, for example, about 75–300° C. The preparation of this catalyst and its activation for use are described in U.S. Pats. 2,544,756; 2,544,771; 2,575,403; and 2,575,404. The composition of the active catalyst is not fully known, but it is believed to be essentially a mixture of copper chromites or chromates and some copper oxide. It is conventionally prepared by coprecipitating a complex copper chromate, usually in the presence of ammonium ion or ammonia. The precipitated chromate is then thermally decomposed to obtain copper chromite. The activity of the catalyst is preferably stabilized by incorporation of a minor amount of a barium salt during its preparation. The barium is apparently chemically combined in the catalyst structure as a barium chromate or chromite. The term "copper chromite" is used in this specification and the appended claims to mean the catalyst made by coprecipitation and thermal decomposition as described above, both without barium and the barium-stabilized material, as distinguished from mere mechanical mixtures of copper and chromium oxides which have sometimes been used for the same purpose but which have a different structure and show different catalytic activity. Although copper chromite, with or without added barium, is an effective catalyst in the hydrogenation of many carbonyl compounds, the reduction is often slow or incomplete for such compounds when they contain chlorine or bromine substituents. Particularly in the case of aromatic ketones and aldehydes having at least one nuclear bromine or chlorine substituent, copper chromite catalyst is often ineffective to promote efficient hydrogenation of the carbonyl group to the carbinol. Such hydrogenation is especially difficult when, as is often the case, there are halogen-containing impurities present in the halogenated ketone or aldehyde, even though those impurities may be present only in trace amounts. More commonly encountered ketones and aldehydes of this class have the structure

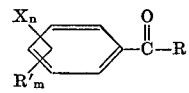

wherein R is hydrogen or an alkyl radical of 1–3 carbon atoms, R′ is lower alkyl or lower alkoxy, the term lower meaning in each case those radicals of 1–4 carbon atoms, X is chlorine or bromine, $m$ is zero or one, and $n$ is one or two. Compounds represented by this formula include o-chlorobenzaldehyde, p-bromobenzaldehyde, 2,4-dichlorobenzaldehyde, 2-chloro-4-ethoxybenzaldehyde, 3,5-dichloro-4-methoxybenzaldehyde, 2-chloro-p-tolualdehyde, o-chloroacetophenone, 2′,5′-dichloroacetophenone, p-bromoacetophenone, 2′,4′-dichloro-3′-methylacetophenone, 4′-tert-butyl-2′-chloroacetophenone, 2′-bromo-4′-tert-butylacetophenone, 2′-chloro-4′-methoxypropiophenone, 2′,4′-dichloropropiophenone, and 2′-bromobutyrophenone.

SUMMARY OF THE INVENTION

It has now been found that in the hydrogenation of such a nuclearly halogenated aromatic ketone or aldehyde to the corresponding carbinol at conventional elevated temperature and pressure and in the presence of a copper chromite hydrogenation catalyst, faster or more complete hydrogenation is provided by the additional presence in the reaction mixture of an alkaline earth metal oxide or hydroxide. The term alkaline earth metal is used in this specification and in the appended claims in its usual sense to mean calcium, strontium, and barium. Calcium oxide and calcium hydroxide are preferred additives. Mixtures of two or more such compounds can be used.

DETAILED DESCRIPTION

The quantity of alkaline earth metal oxide or hydroxide is not critical for any significant quantity will give some improvement in the hydrogenation process. However, best results are obtained by using about 1–15 percent of the base calculated on the weight of carbonyl compound or correspondingly, about 1–10 times the weight of copper chromite.

Surprisingly, the presence of basic substances other than those described above either have no substantial effect on the reduction or have a deleterious effect. For example, bases such as sodium hydroxide or sodium carbonate and related compounds such as calcium carbonate and magnesium hydroxide are either of no advantage or are disadvantageous when present in the reaction mixture in place of the alkaline earth oxides and hydroxides of this invention.

The general conditions of this improved reduction are those of the prior art process. As noted above, temperatures of 75–300° C. are suitable and a temperature of 100–175° C. is usually preferred. Although some reduction occurs at atmospheric pressure, superatmospheric pressure is ordinarily employed in order to get a more practical rate of hydrogenation. Pressures of 5–500 atmospheres are conventional for the process and a pressure of 10–50 atmospheres is typical. An inert organic solvent may facilitate practical operation of the process. Alcohols and saturated aliphatic and cycloaliphatic hydrocarbons are examples of solvents which are particularly adapted to the process. The alcohol product of the reduction can be used as the reaction medium.

Dehalogenation during the reduction by this improved process is not a serious problem. For example, in the experiments listed below it amounts to about one percent or less of the halogenated carbonyl compound which is reduced. Yields of carbinol based on the amount of ketone or aldehyde converted, therefore, usually run better than 95 percent of the theoretical.

EXAMPLES 1–7

In the experiments listed below, the following procedure was employed. ar-Chloroacetophenone, a commercial barium-stabilized copper chromite hydrogenation catalyst, and an additive as noted were charged to a stainless steel rocking autoclave. The sealed autoclave was preheated to 150° C., purged with nitrogen or evacuated, flushed with hydrogen, and then pressured with hydrogen at the reduction temperature and pressure desired. The hydrogenation was run under these conditions for 16 hours, and the reaction mixture was then filtered and analyzed to determine its composition. These reductions were run at 500 lbs./sq. in. gauge hydrogen pressure unless otherwise noted using a chloroacetophenone feed as specified. In these and in the other examples, the percent conversion listed is the proportion of total halocarbonyl compound converted to the corresponding ar-halo alcohol. This figure represents essentially that proportion of halocarbonyl compound reacted, for dehalogenation was not a significant factor.

Examples 1–3 were run using a feed containing about 73 percent by weight of ar-chloroacetophenone consisting of the ortho and para isomers in about equal proportions, the remainder being essentially the corresponding carbinols.

A similar feed was used in Examples 4 and 5, this material analyzing 25.9 percent o-chloroacetophenone, 44.2 percent p-chloroacetophenone, and the remainder essentially the corresponding carbinols.

TABLE I

| Run No. | Feed | Catalyst, g. | Ca(OH²), g. | Temp., °C. | Percent conversion |
|---|---|---|---|---|---|
| 1 | 721 g. ortho-para mixture | 16 | 0 | 175 | 0 |
| 2 | 800 g. ortho-para mixture | 8 | 20 | 150 | 55.3 |
| 3 | do | 8 | 20 | 175 | 85.3 |
| 4[1] | do | 4 | 0 | 150 | 0 |
| 5[1] | do | 4 | 40 | 150 | 100 |
| 6 | 800 g. pure ortho | 40 | 80 | 150 | 100 |
| 7 | do | 16 | 20 | 150 | 54.1 |

[1] Hydrogenated at 750 lbs./sq. inch gauge pressure.

EXAMPLES 8–11

Using a procedure similar to that described for Examples 1–7, various halogenated aromatic ketones and aldehydes were hydrogenated by the present process. In these experiments, a stainless steel rocker bomb of 183 ml. total capacity was charged with 80 g. of the aromatic compound, 0.4 g. of the copper chromite catalyst used in the previous examples, and 4 g. of calcium hydroxide. This mixture was heated under nitrogen for 30 minutes at 150° C., then the bomb was flushed with hydrogen and the hydrogenation was carried out at 500 p.s.i.g. hydrogen pressure and 150° C. for 12 hours. The resulting mixture was then worked up as before to determine conversion of the carbonyl compound to the corresponding carbinol.

TABLE II

| Example | Carbonyl compound | Percent conversion |
|---|---|---|
| 8 | p-Bromoacetophenone | 35.5 |
| 9 | 2′,4′-dichloroacetophenone | 47.2 |
| 10 | o-Chlorobenzaldehyde | 39.0 |
| 11 | p-Chlorobenzaldehyde | 90.7 |

When these reductions are repeated without the lime additive, little or no reduction to the carbinol is found.

EXAMPLES 12–17

Using the procedure and apparatus of Examples 8–11, a chloroacetophenone fraction was hydrogenated, using additives as specified below. The chloroacetophenone fraction had been treated with activated alumina and distilled. Its composition in weight percent was as follows:

| | Percent |
|---|---|
| o-Chloroacetophenone | 19.5 |
| p-Chloroacetophenone | 46.3 |
| o-Chloro-α-methylbenzyl alcohol | 28.5 |
| p-Chloro-α-methylbenzyl alcohol | 5.7 |

Traces of non-halogenated alcohol and ketone were also present. In each experiment, the amount of feed, the kind and quantity of copper chromite catalyst, and the quantity of additive, where used, was the same as in Examples 8–11. The conversion listed is the percent of the originally charged chloroacetophenone which was converted to the corresponding carbinol.

TABLE III

| Example | Additive | Percent conversion |
|---|---|---|
| 12 | None | 4.4 |
| 13 | Calcium hydroxide | 86.3 |
| 14 | Calcium carbonate | 7.3 |
| 15 | Barium hydroxide | 81.8 |
| 16 | Strontium hydroxide | 45.7 |
| 17 | Magnesium hydroxide | 6.4 |

Examples 12, 14 and 17 are included to show the negative results obtained when using respectively the prior art process or an additive closely related to but not included in the group of compounds useful in the present invention.

EXAMPLES 18–24

Using the apparatus and general procedure of Examples 8–11 except that the preheating step was of 2 hours duration at 150° C. and at 150 mm. Hg absolute pressure, a number of catalyst-additive combinations were tested. The organic feed was a mixture containing about 70 percent of ar-chloroacetophenones consisting of the ortho and para isomers in about equal proportions and the remainder was essentially the corresponding carbinols. All hydrogenations were of 6 hours duration. Catalysts and additive concentrations are expressed in weight percent of the organic feed. The conditions were 150° C. and 500 lbs. gauge hydrogen pressure for Examples 18–20, 155° C. and 600 lbs. pressure for Examples 21–24.

TABLE IV

| Examples | Catalyst and additive | Percent conversion |
|---|---|---|
| 18 | 2% Cu chromite—no additive | 0 |
| 19 | 2% Cu chromite—5% Ca(OH)₂ | 92 |
| 20 | 2% Cu chromite—3.8% CaO [1] | 92 |
| 21 | 3% Cu chromite—5% CaO | 100 |
| 22 | 3% Cu chromite—5% BaO | 85 |
| 23 | 3% Cu chromite—5% SrO | 66.5 |
| 24 [2] | 2% Cu₂O—1% Cr₂O₃—5% CaO | 16.1 |

[1] Mole equivalent of 5% Ca(OH)².

[2] This catalyst was prepared as described by Stewart, 2,400,959. Cuprous oxide was precipitated by adding aqueous sodium hydroxide to a solution of cupric nitrate containing dextrose. Chromium oxide was precipitated by adding ammonium hydroxide to aqueous chromium nitrate. These oxides were then combined with calcium oxide after washing and drying.

Comparative Example 24 shows that the cuprous oxide-chromium oxide catalyst of the Stewart patent is not the equivalent of copper chromite for the purpose of the present invention. In contrast to the lack of catalytic activity in the hydrogenation of ar-chloroacetophenone found in Example 24, the same Stewart catalyst was fully effective when applied to the hydrogenation of acetophenone itself, all of the acetophenone being converted to the corresponding carbinol under the listed conditions.

EXAMPLES 25-26

Using the procedure and the relative proportions of ketone, copper chromite catalyst, and lime as specified in Examples 8-11, 4'-tert-butyl-2'-chloroacetophenone is reduced under the same conditions to obtain about 80 percent conversion of the ketone to 4-tert-butyl-2-chloro-α-methylbenzyl alcohol.

In the same way, the corresponding brominated compound, 2'-bromo-4'-tert-butyl-acetophenone is reduced to 2-bromo-4-tert-butyl-α-methylbenzyl alcohol. The conversion is somewhat lower than that of the chloro compound.

In each of the above cases, when reduction is attempted as described but in the absence of lime or other alkaline earth metal hydroxide, essentially no reduction is obtained or the reduction is very slow and incomplete.

We claim:
1. In a reduction process wherein an aromatic carbonyl compound of the formula

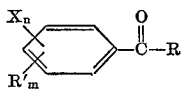

wherein R is hydrogen or alkyl of 1-2 carbon atoms, R' is lower alkyl or lower alkoxy, X is chlorine or bromine, $m$ is 0 or 1, and $n$ is 1 or 2, is hydrogenated to the corresponding carbinol by contacting with hydrogen at an elevated temperature and superatmospheric pressure and in the presence of copper chromite hydrogenation catalyst, the improvement wherein said reduction is carried out in the presence of at least one alkaline earth metal compound selected from the group consisting of the oxides and hydroxides of calcium, barium and strontium.

2. The process of claim 1 wherein the alkaline earth metal is calcium.

3. The process of claim 1 wherein the alkaline earth metal is barium.

4. The process of claim 1 wherein the alkaline earth metal is strontium.

5. The process of claim 1 wherein the aromatic carbonyl compound is ar-chloroacetophenone.

6. The process of claim 1 wherein the aromatic carbonyl compound is ar-chloroacetophenone.

7. The process of claim 1 wherein the aromatic carbonyl compound is ar-chlorobenzaldehyde.

8. The process of claim 1 wherein the aromatic carbonyl compound is ar-bromoacetophenone.

9. The process of claim 1 wherein the aromatic carbonyl compound is ar-lower alkyl-ar-chloroacetophenone.

10. The process of claim 1 wherein the aromatic carbonyl compound is ar-lower alkyl-ar-bromoacetophenone.

References Cited

Emerson et al.: J. Am. Chem. Soc., vol. 70 (1948), pages 1180.

BARNARD HELFIN, Primary Examiner

U.S. Cl. X.R.

260—613

PO-1050
(5/69)

UNITED STATES PATENT OFFICE
CERTIFICATE OF CORRECTION

Patent No. 3,527,817          Dated September 8, 1970

Inventor(s) Andrew J. Dietzler, Junior J. Lamson & Richard H. Hall

It is certified that error appears in the above-identified patent and that said Letters Patent are hereby corrected as shown below:

Column 5, line 29, delete "1-2" and insert --1-3--.

Column 6, line 15, delete "ar-chloroacetophenone" and insert --ar-dichloroacetophenone--.

SIGNED AND
SEALED
MAR 9 1971

(SEAL)
Attest:

Edward M. Fletcher, Jr.
Attesting Officer

WILLIAM E. SCHUYLER, JR.
Commissioner of Patents